C. LEACH.
Draft-Equalizer.
No. 207,611. Patented Sept. 3, 1878.
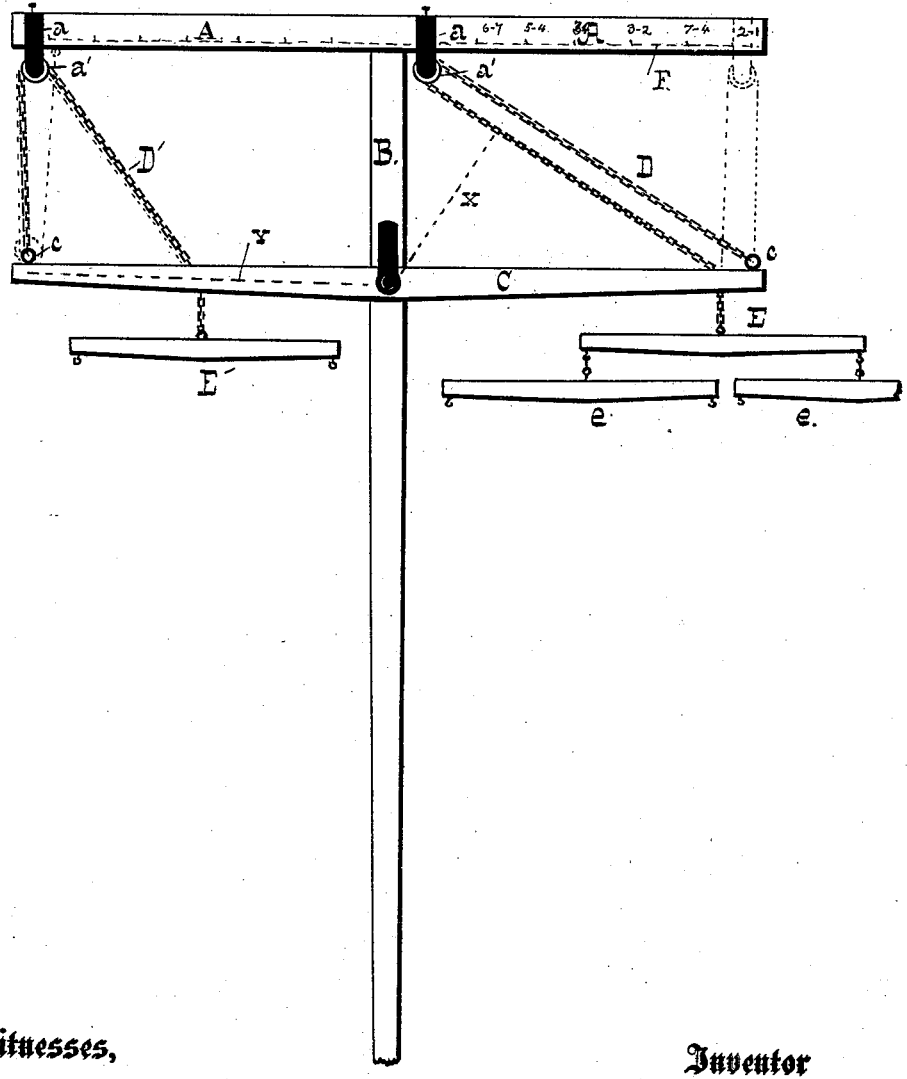
Witnesses,
W. A. Butram
Dr L. H. Barclay
Inventor
C. Leach
by R. W. Williams
Attorney.

UNITED STATES PATENT OFFICE.

CHARLES LEACH, OF WARSAW, ASSIGNOR OF ONE-HALF HIS RIGHT TO GEORGE W. ADAMS, OF ALLERTON, IOWA.

IMPROVEMENT IN DRAFT-EQUALIZERS.

Specification forming part of Letters Patent No. 207,611, dated September 3, 1878; application filed July 26, 1878.

*To all whom it may concern:*

Be it known that I, CHARLES LEACH, of Warsaw, Wayne county, State of Iowa, have invented certain new and useful Improvements in Draft-Equalizers; and I hereby declare the same to be fully, clearly, and exactly described as follows, reference being had to the accompanying drawings, in which the device is illustrated in plan view.

This invention has reference to what are known as "three-horse draft-equalizers," in which the animals are driven abreast, two of them being harnessed to a double-tree on one side of the tongue of the vehicle or machine; and my said invention consists in a device for equalizing the draft, or for giving to the draft of the single horse any desired ratio of effect to that of the pair, as hereinafter described.

In the accompanying drawings, A is a bar firmly secured to the front of the vehicle, and having on either side of the tongue B a metallic strap, $a$, carrying a pulley, $a'$. These are adapted to slide upon the bar A and be secured at any desired point by means of set-screws or pins, as shown. C is the cross-tree, pivoted, as usual, to the tongue B, and having at either end an eye, $c$, to which the chains D D' are attached. These are led around the pulleys $a'$ $a'$, and back through eyes on the under side of the cross-tree C, and are attached, respectively, to the double-tree E and single-tree E', the former of which is provided with the usual single-trees $e$ $e$.

Such is, in general terms, a description of the construction of the device, and its operation is based upon giving to the drafts, respectively, of the single horse and the pair an effect proportioned to their acting distances from the fulcrum. In other words, the effects of the draft on the ends of the cross-tree will obviously be as the distance $x$ to the distance $y$. In the figure these are shown as 1 to 2; but it is evident that by sliding the strap $a$ along the bar A this ratio may be altered, as desired, and the bar A is furnished with a scale, F, whose divisions show the proportion for each point in its length.

In dotted lines I have illustrated a modification of my invention. In this case the strap $a$ is slid to the end of the bar A, and the single-horse chain D' is attached to the bar A instead of the cross-tree C, being led, as shown in dotted lines, around a pulley on the end of the cross-tree, thence around one on the bar A, and finally to the single-tree E'. It is obvious that the effect of the single-horse draft is thereby doubled, according to the well-known equation for the pulley.

Having thus described my invention, what I claim as new, and desire to secure by Letters Patent, is—

In combination with the cross-tree C and single and double trees E' E, the chains D D', bar A, and adjustable pulley-straps $a$, substantially as described.

CHARLES LEACH.

Witnesses:
  J. W. GLADMAN,
  N. E. PARSONS.